June 7, 1966    J. S. SCOGGIN    3,254,365
APPARATUS FOR COAGULATING AND PELLETIZING POLYMER SOLUTIONS
Filed May 31, 1963    2 Sheets-Sheet 1

INVENTOR.
J.S. SCOGGIN
BY Young & Quigg
ATTORNEYS

INVENTOR.
J.S. SCOGGIN
BY Young & Quigg
ATTORNEYS

United States Patent Office 3,254,365
Patented June 7, 1966

3,254,365
APPARATUS FOR COAGULATING AND
PELLETIZING POLYMER SOLUTIONS
Jack S. Scoggin, Bartlesville, Okla., assignor to Phillips
Petroleum Company, a corporation of Delaware
Filed May 31, 1963, Ser. No. 284,722
6 Claims. (Cl. 18—2)

This invention relates to an apparatus for recovery of polymers of olefins. In one aspect this invention relates to a novel apparatus for the recovery of polymer particles. In another aspect this invention relates to an apparatus for providing particles or strands of polymeric compositions.

Processes for forming polymers of olefins are well known in the art. One such process is that disclosed by Hogan and Banks, U.S. Patent 2,825,721, March 4, 1958, and by Ziegler Belgium Patent 533,362. Another process for conventional solution polymerization is disclosed by W. C. Lanning, U.S. Patent 2,894,824. Likewise there is disclosed by R. P. Zelinski in U.S. Patent 3,070,587 a conventional system for the solution polymerization of conjugated olefins, such as butadiene. However, because of the physical characteristics of the resulting polymerization products, it heretofore has been believed necessary to form such compounds in a dilute form by the addition of a solvent to the system due to the high viscosity of the polymeric compositions. Thus it would be extremely advantageous to provide a means for handling such polymeric composition to avoid the necessity of having large amounts of solvent present in the system.

Accordingly, it is an object of the present invention to provide an apparatus capable of handling concentrated polymeric solutions so as to avoid the necessity of having present in the system the heretofore required amounts of solvents.

Another object of this invention is to provide means for removing solvent present in an otherwise difficult to separate polymer system due to the viscosity of the resulting polymer.

Another object of this invention is to provide a system which is capable of allowing the solvent content of the system to be reduced over that heretofore required.

A further object of this invention is to provide a novel apparatus which is capable of handling a highly concentrated polymeric solution so as to avoid large amounts of solvent in the polymerization system and thereby increase plant throughput.

A still further object of this invention is to provide an apparatus which not only is capable of removing solvent and solvent traces from a polymer stream but which also is capable of rendering the resulting solvent-free polymer into a particle form suitable for subsequent processing.

Other objects, aspects and the several advantages of this invention will be apparent from the following specification, claims and the drawings, of which:

Figure 1:
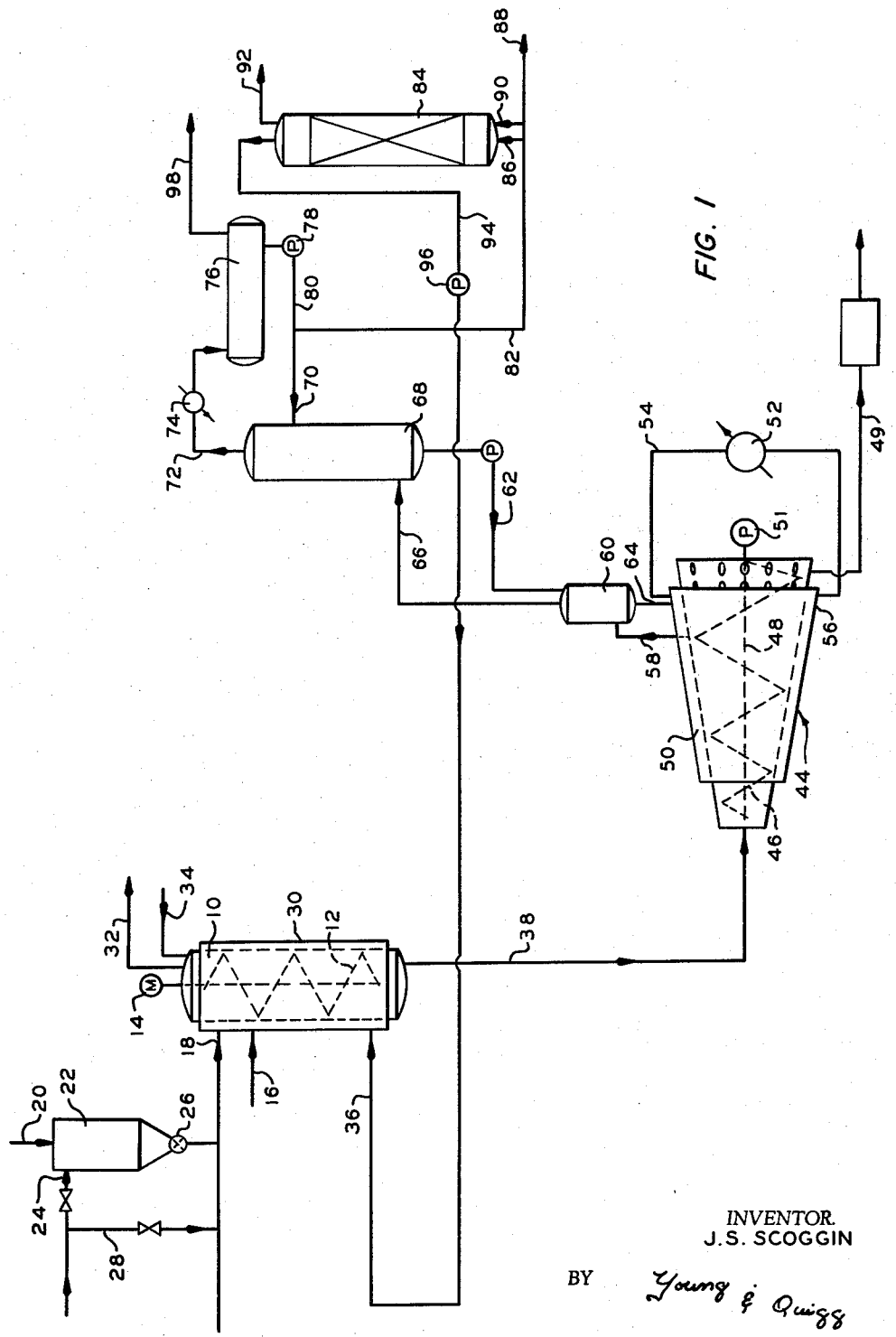
FIGURE 1 is a schematic illustration of an arrangement of plant apparatus for producing polyolefins by the solution process utilizing a high-solids reactor and the concentrator-pelletizer of the present invention.

In accordance with the present invention I have provided a novel apparatus for the concentration and subsequent pelletizing of polymer which avoids the presence of or necessity for large amounts of solvent in the system.

Referring to the drawing, a high-solids reactor 10 is provided with scraper and/or auger means 12 operated by motor 14. Olefin feed is introduced to the reactor via line 16 and a suspension of finely divided chromium oxide catalyst in solvent is introduced through line 18. Activated catalyst from line 20 enters catalyst mud tank 22 along with make-up solvent from line 24 in sufficient volume to form a catalyst mud which is fed by feeder 26 into line 18 as a catalyst mud which is mixed with solvent from line 28 to form a suitable suspension of catalyst in solvent and provide the required amount of make-up solvent to maintain the desired concentration in the reactor.

Reactor 10 preferably is jacketed as illustrated by jacket 30 through which coolant is circulated through lines 32 and 34. Recycle solvent is introduced to the reactor from line 36 and effluent solution of polymer is withdrawn through line 38 and passed to frusto-conical thin-film evaporator or concenrtator 44.

Evaporator 44 is provided with agitating means comprising blades or vanes 46 operating on an axial shaft 48 propelled by motor 51. Other arrangements than that shown for agitation of the polymer and removal of film from the walls of the evaporator may be utilized. In one form of the thin-film evaporator, scraper blades are operated both in an annulus and a concentric truncated conical chamber to remove thin films of concentrated polymer from the wall of the concentration chamber and to provide adequate mixing of the solvent.

The shell concentrator 44 is elongated so as to form a die face through which the polymer free of solvent emerges. Scraping or chopping means are provided on the face of the die so as to remove the polymer or pellets. Quench medium is introduced around the die area and serves not only to lower the temperature of the polymer particles but also to remove the resulting pellets from the pelletizer.

The pelletized concentrated polymer is recovered through line 49, quenched, and passed to a drier or other treating step for final polymer finishing. Heat for the evaporation of solvent is applied through jacket 50 surrounding the concentration chamber and a heat exchange fluid is circulated therethrough from heater 52 via lines 54 and 56. Line 58 takes off evaporated solvent and passes same to a small contacting chamber 60 wherein the solvent vapor, containing a small amount of polymer, is contacted in countercurrent flow by liquid solvent introduced from line 62 so as to remove the polymer and return it to the evaporator via line 64.

Line 66 conducts solvent vapor from contactor 60 to scrubber 68 where the vapor is contacted in countercurrent flow with liquid solvent introduced through line 70. A portion of the liquid solvent is thus vaporized while cooling the vapors and passes overhead along with solvent vapor introduced through line 66 via line 72 through condenser 74 into storage tank 76. The stored liquid solvent is circulated by pump 78 through line 80 to lines 70 and 82, that passing to line 82 being circulated through solvent driers 84 from line 86. Excess solvent is removed through line 88.

Driers 84, usually utilized in pairs to permit regeneration, are packed with activated alumina which purifies the solvent by removing water and other deleterious components of the solvent stream. Regeneration gas is passed through the driers from line 90 and passed to a flare or steam exhaust through line 92 when being regenerated. Purified solvent is passed through line 94 under the impetus of pump 96 to reactor 10.

Olefins separating from liquid solvent in storage tank 76 are passed to olefin purification via line 98, from which the olefins may be recycled to reactor 10 by means not shown.

The high-solids reactor may be of the type disclosed in the aforementioned Lanning patent or other high viscosity reactor such as those available from Crawford and Russell, Engineers and Contractors, Stamford, Connecticut.

The so-called C & R reactor is exceptionally well adapted to the high-solids solution process of the invention. The C & R reactor utilizes a cylindrical reaction chamber surrounded by a cooling annulus and an annular reaction zone concentric with the cooling annulus and surrounded by a second concentric cooling annulus with scraper blades rotating over both walls of the annulus and the wall of the cylindrical reaction chamber. While the invention has been illustrated with high-solids reaction, it is intended to cover as well conventional polymerization such as disclosed in Hogan and Banks, U.S. Patent 2,825,721.

The reactor can be constructed to utilize cooling by autorefrigeration of solvent, thereby either eliminating or supplementing the jacket cooling.

Figure 2:
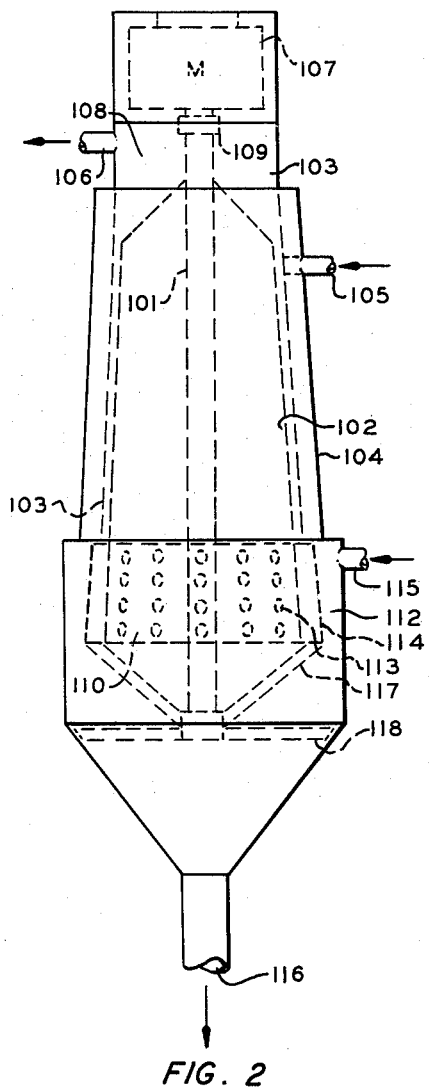
FIGURE 2 is a cross-sectional view of the novel concentrator-pelletizer used in the system of FIGURE 1.

The evaporator-pelletizer as shown in FIGURE 2 utilizes an axial shaft 101 provided with longitudinal blades 102 radially extending to close proximity of a tapered shell or housing 103 of circular transverse cross section with a heated jacket 104 encircling the shell. The evaporator can be in either the horizontal or the vertical position. When combined on stream with a high-solids reactor 10 such as shown in FIGURE 1, the reactor effluent passes by way of conduit 40 to polymer inlet 105. The polymer progresses downwardly, assisted by blades 102, in the form of a thin film. Heater jacket 104 serves to evaporate the solvent which is removed through outlet 106. Motor 107 sealed off from the evaporator chamber 108 by means of seal 109 serves to rotate blades 102 and cutters 114. The lower area of chamber 108 is sealed by means of the polymer which prevents solvent vapors from entering pelletizing zone 112. When the polymer reaches die 110 formed by a continuation of housing 103, it extrudes through the small holes 113 therein and is removed by cutters or scrapers 114 mounted on shaft 101 by means of mounts 117 as motor 107 revolves the shaft 101 and thereby blades 102 and die cutters 114. Supports 118 are provided to secure the lower end of shaft 101. A quench medium such as water or air is introduced through inlet 115 to quench the pelletized polymer particles and to assist in removal of the pellets from zone 112 to conduit 116 for subsequent heating or other treatment.

While FIGURE 2 shows the evaporator-pelletizer to be in a vertical position, it likewise can be in a horizontal position as shown in FIGURE 1. The pitch of the evaporator blades 102 can be adjusted to suit the viscosity of the material being introduced into the evaporator-pelletizer from the reactor.

The invention is applicable to the polymerization of aliphatic 1-olefins having from 2 to 8 carbon atoms per molecule and no chain branching nearer the double bond than the 4-position. These olefins include those disclosed in the patent to Hogan and Banks, U.S. Patent 2,825,721, particularly ethylene, propylene, 1-butene, 1-pentene, 1-hexene, 1-heptene, 1-octene, 4-methyl-1-pentene, butadiene and isoprene. Homopolymers and copolymers can be made by this process. Substantially pure ethylene can be polymerized by this process or ethylene can be copolymerized with any of the other monomers, particularly in minor concentration, to produce a copolymer consisting principally of ethylene polymer. Butene-1 is commonly utilized in minor concentration in the ethylene feed to produce a polyolefin which has exceptionally desirable properties.

To further illustrate the invention, reference is made to an ethylene polymerization process in a high-solids reactor and utilizing the thin-film evaporator-pelletizer of this invention.

In this process, ethylene is fed into the reactor at the rate of about 76,749 pounds per day at a temperature of about 230° F. Activated catalyst consisting essentially of chromium oxide (a portion hexavalent) deposited on silica-aluminum (chromium oxide concentration about 2 weight percent) in finely divided form, 50 weight percent being less than 10 microns in size, is admixed with cyclohexane (as the solvent feed) and the resulting catalyst slurry fed to the reactor at the rate of 14.4 pounds of catalyst and 6000 pounds of cyclohexane per day. By means of circulating cooling water through the jacket of the reactor, the temperature is maintained at about 260° F. and the reactor pressure is controlled at about 450 p.s.i.a.

The effluent solution of polymer, containing about 40 weight percent polymer, is fed into the evaporator-pelletizer at a temperature of about 250° F. Indirect heat exchange with "Dowtherm" at 500° F. circulated through the evaporator jacket raises the temperature of the solution to about 400° F. at a reduced pressure of about 90 p.s.i.a. Evaporation of cyclohexane from a thin film on the walls of the evaporator concentrates the polymer to above 98 weight percent, and the concentration of catalyst in the polymer is about 0.02 weight percent or less, which is within commercial specification.

The polymer is then pelletized by means of pellet dies in the evaporator-pelletizer. Water at a rate of 230 g.p.h. is introduced into the pelletizing zone to quench the pellets and to aid in removal of same to the drier. The recovery of pellets from the drier is at a rate of 72,000 pounds per day.

The vapor stream from the evaporator is passed at the rate of about 117,252 pounds per day to a solvent vapor scrubber. This stream contains about 7,092 pounds of ethylene, the balance being cyclohexane. The temperature in the scrubber is maintained at about 300° F., being dropped from about 400° F. by recycling about 28,800 pounds of liquid solvent per day at 110° F. containing about 684 pounds of ethylene. While the pressure in the scrubber and in the solvent storage tank is maintained at about 90 p.s.i.a., a pressure of atmospheric or below can be utilized.

A bottom stream from the scrubber is used to remove any polymer in the effluent vapor from the evaporator. This stream amounts to about 10,680 pounds per day and contains 24 pounds of ethylene. The recycle solvent stream at a temperature of 110° F. amounts to about 97,251 pounds per day and contains about 2,319 pounds of ethylene. This recycle stream is dried in alumina driers before being recycled.

The process conditions illustrated may be varied within the scope of the invention. Reactor temperatures will vary, depending upon the type of feed and the character of the polymer being produced. Temperatures in the range of about 100° to 500° F. and preferably in the range of about 175° to 350° F. are used in the reaction zone with pressures adequate to maintain olefin dissolved in liquid solvent. Evaporator conditions also will vary, the temperature ranging from about 350° to 450° F. and pressure being substantially below reactor pressure or preferably in the range of about atmospheric to 200 p.s.i.

When a low solids-content reactor is utilized with the process and apparatus of this invention, suitable means for treating the reactor effluent such as for washing, stripping or for treating with a treating agent are installed in line 40 prior to introduction of the resulting stream to the concentrator-pelletizer of the invention.

While a portion of the apparatus of the invention has been termed a "concentrator-pelletizer," this term is intended to include such apparatus when operated without the cutters or scrapers 114 so as to produce strands rather than pellets. Also, while illustrated as having the cutters 114 actuated by motor 107 and shaft 101, the cutters can be and are preferably independently actuated by a separate drive system, not shown, which then allows for variable cutter speed control independent of the scrapper blades 101.

Various modifications of the invention will be apparent to those skilled in the art, and the illustrative details disclosed are not to be construed as unnecessarily limiting the invention.

I claim:
1. Apparatus for concentrating and pelletizing polymer solutions which comprises, in combination, a frusto-conical chamber having an annular passage extending axially through same, means to supply heat to said chamber, means to introduce a polymer solution to said annular passage, means to remove vapor from said chamber, means to agitate said polymer solution in said annular passage so as to produce shear thereto, means extending from said chamber and in communication with said annular passage forming a die means for the concentrated polymer solution, means adjacent said means extending from said chamber to sever said concentrated polymer solution as it passes through said die means, and means to remove and recover the resulting polymer particles therefrom.

2. Apparatus according to claim 1 wherein said means extending from said chamber comprises a preforated shell section having at least one perforation therein, means to propel said concentrated polymer solution through said perforated shell, means to cut said polymer solution as it passes through said perforated shell so as to form pellets thereof, and means to quench the resulting polymer pellets and to remove same from the vicinity of said perforated shell.

3. Apparatus according to claim 2 wherein said means to quench and remove pellets comprises a jacket means external the area of said perforated shell, said jacket means having provided therein means to introduce a quench medium to the vicinity of said perforated die so as to quench the polymer pellets as formed and outlet means to collect and remove the quenched pellets from the system for further treatment.

4. Apparatus according to claim 1 wherein there is provided a motor positioned external said chamber and so adapted as to rotate a shaft extending axially through said chamber, said die means and said means to agitate said polymer solution being adapted to said shaft so as to function in response to the rotation of said shaft within said chamber.

5. Apparatus for concentrating and pelletizing polymer solutions which comprises, in combination, an outer shell of a frusto-conical configuration forming a concentrating zone and a pelletizing zone, means provided within said zones in said shell to maintain a film of material in intimate contact with the inner surface of said shell, a shaft member extending axially through said zones having said means supported thereon, power means in association with said shaft means to cause same to rotate within said shell, first inlet means to introduce a polymer solution to be concentrated into said concentrating zone, outlet means in said concentrating zone to remove vapors from same, heat exchange means surrounding the concentrating zone of said tapered shell, die means communicating with said concentrating zone, means extending around said pelletizing zone so as to enclose same, cutting means rotatable about said die means and traversing the length of same to sever material from said die means, second inlet means so adapted as to introduce a quench medium into said pelletizing zone, and second outlet means to remove said quench medium and quenched material from said pelletizing zone.

6. An apparatus for concentrating and pelletizing a polymer-containing solution which comprises, in combination, a frusto-conical shell having a first and a second part, heat exchange means associated with said first part, means internal said shell to maintain a film of liquid on the inner surface of said shell, a shaft member extending axially through said first and second parts of said shell, means associated with said shaft member to support said means to maintain a film of liquid on the inner surface of said shell, means associated with said shaft member to rotate same within said shell, first inlet means to introduce liquid into said shell, first outlet means to remove vapors from said shell, die means comprising said second part of said shell containing at least one perforation therein, jacket means external to and surrounding said die means, second inlet means to introduce a quench medium into the vicinity of said die means, second outlet means to remove said quench medium and polymer from said jacket surrounding said die means, cutting means extending the length of said die means to remove polymer particles emerging through same, support means associated with said cutting means and said shaft member to maintain said cutting means in association with said die member and to rotate same about said die member in response to the rotation of said shaft member within said chamber, valve means in said second outlet, and means to regulate the removal of polymer particles and quench medium from said jacket surrounding said die means.

References Cited by the Examiner

UNITED STATES PATENTS 2,319,859 5/1943 Hale _____ 18—2 XR
3,025,565 3/1962 Doriat et al. _____ 18—2 XR

OTHER REFERENCES

"New Extrusion Dryer for Low-Ash SBR in operation at Institute W. Va. Plant," Rubber World, July 1960, pp. 76–78.

WILLIAM J. STEPHENSON, *Primary Examiner.*